United States Patent
Hakola et al.

(10) Patent No.: US 10,630,358 B2
(45) Date of Patent: Apr. 21, 2020

(54) DISCOVERY SIGNAL TRANSMISSION IN CELLULAR SYSTEM

(71) Applicant: NOKIA SOLUTIONS AND NETWORKS OY, Espoo (FI)

(72) Inventors: Sami-Jukka Hakola, Kempele (FI); Esa Tapani Tiirola, Kempele (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/767,343

(22) PCT Filed: Oct. 12, 2015

(86) PCT No.: PCT/EP2015/073506
§ 371 (c)(1),
(2) Date: Apr. 10, 2018

(87) PCT Pub. No.: WO2017/063661
PCT Pub. Date: Apr. 20, 2017

(65) Prior Publication Data
US 2018/0294860 A1    Oct. 11, 2018

(51) Int. Cl.
*H04B 7/06* (2006.01)
*H04W 48/08* (2009.01)
(Continued)

(52) U.S. Cl.
CPC ......... *H04B 7/0617* (2013.01); *H04B 7/0408* (2013.01); *H04B 7/0452* (2013.01);
(Continued)

(58) Field of Classification Search
CPC ..... H04W 16/28; H04W 24/02; H04W 88/08; H04W 64/00; H04W 72/06;
(Continued)

(56) References Cited

U.S. PATENT DOCUMENTS 9,408,161 B2    8/2016  Frenger et al.
9,420,474 B1 *  8/2016  Pawar ................... H04W 16/28
(Continued)

FOREIGN PATENT DOCUMENTS

CN        103686746 A    3/2014
JP        2010533391 A   10/2010
(Continued)

OTHER PUBLICATIONS

International Search Report and Written Opinion for International Application No. PCT/EP2015/073506, dated Jul. 8, 2016 (9 pages).
(Continued)

*Primary Examiner* — Janice N Tieu
(74) *Attorney, Agent, or Firm* — Brake Hughes Bellermann LLP

(57) ABSTRACT

There is provided a solution for transmitting periodic signals in a cell. According to an aspect a method comprises in a network node: generating a plurality of radio beams in a cell, wherein said plurality of radio beams comprise a plurality of beam-forming configurations, and wherein at least one radio beam comprised in the plurality of radio beams comprises a discovery signal transmission; determining, for the at least one radio beam, whether or not at least one terminal device is located in a coverage area of the at least one radio beam; defining a transmission periodicity of the discovery signal transmission on the basis of said determining.

18 Claims, 6 Drawing Sheets

(51) Int. Cl.
*H04B 7/0408* (2017.01)
*H04W 16/28* (2009.01)
*H04W 48/16* (2009.01)
*H04B 7/0452* (2017.01)

(52) U.S. Cl.
CPC .......... *H04W 16/28* (2013.01); *H04W 48/08* (2013.01); *H04W 48/16* (2013.01); *Y02D 70/1222* (2018.01); *Y02D 70/1224* (2018.01); *Y02D 70/1226* (2018.01); *Y02D 70/1242* (2018.01); *Y02D 70/1262* (2018.01); *Y02D 70/1264* (2018.01); *Y02D 70/146* (2018.01); *Y02D 70/164* (2018.01); *Y02D 70/21* (2018.01); *Y02D 70/25* (2018.01)

(58) Field of Classification Search
CPC ............ H04W 72/0406; H04W 72/14; H04W 72/046; H04B 7/024; H04L 45/747
See application file for complete search history.

(56) References Cited

U.S. PATENT DOCUMENTS

| | | | |
|---|---|---|---|
| 9,854,622 B2 | 12/2017 | Rosa et al. | |
| 9,960,839 B2 | 5/2018 | Jung | |
| 2011/0038308 A1* | 2/2011 | Song | H04B 7/0408 370/328 |
| 2015/0071146 A1 | 3/2015 | Wei et al. | |
| 2015/0094076 A1 | 4/2015 | Inoue et al. | |
| 2016/0100347 A1* | 4/2016 | Ryu | H04W 76/16 455/445 |
| 2016/0165583 A1* | 6/2016 | Ho | H04B 7/0408 370/329 |
| 2018/0269954 A1* | 9/2018 | Raghavan | H04B 7/0695 |

FOREIGN PATENT DOCUMENTS

| | | |
|---|---|---|
| JP | 2013211716 A | 10/2013 |
| JP | 2014195330 A | 10/2014 |
| JP | 2015165640 A | 9/2015 |
| KR | 20130132339 A | 12/2013 |
| KR | 20140055858 A | 5/2014 |
| KR | 20140145155 A | 12/2014 |
| WO | 2014113537 A1 | 7/2014 |

OTHER PUBLICATIONS

3GPP TSG RAN WG1 Meeting #81, R1-153031; CMCC—"Further discussion on discovery signal design for LAA"; Fukuoka, Japan, May 25-29, 2015; XP050971876; 5 pages.

Miao et al.; "Self-organized Multi-hop Millimeter-wave Backhaul Network: Beam Alignment and Dynamic Routing"; 2015 European Conference on Networks and Communications (EuCNC); Jan. 1, 2015; XP055243096; pp. 275-279.

First Office Action for Canadian Application No. 3,000,871, dated Oct. 26, 2018, 5 pages.

Office Action for Korean Application No. 2018-7013469, dated May 2, 2019, 9 pages.

Office Action for Japanese Patent Application No. 2018-537713, dated Jul. 23, 2019, 5 pages.

Office Action for Korean Application No. 10-2018-7013469, dated Nov. 23, 2019, 11 pages.

* cited by examiner

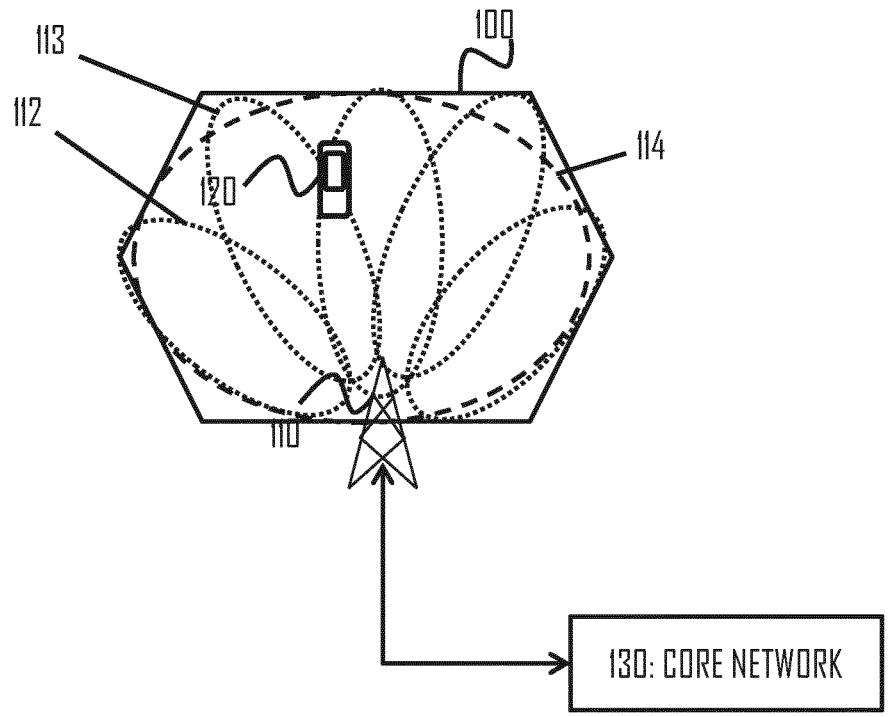
Fig 1
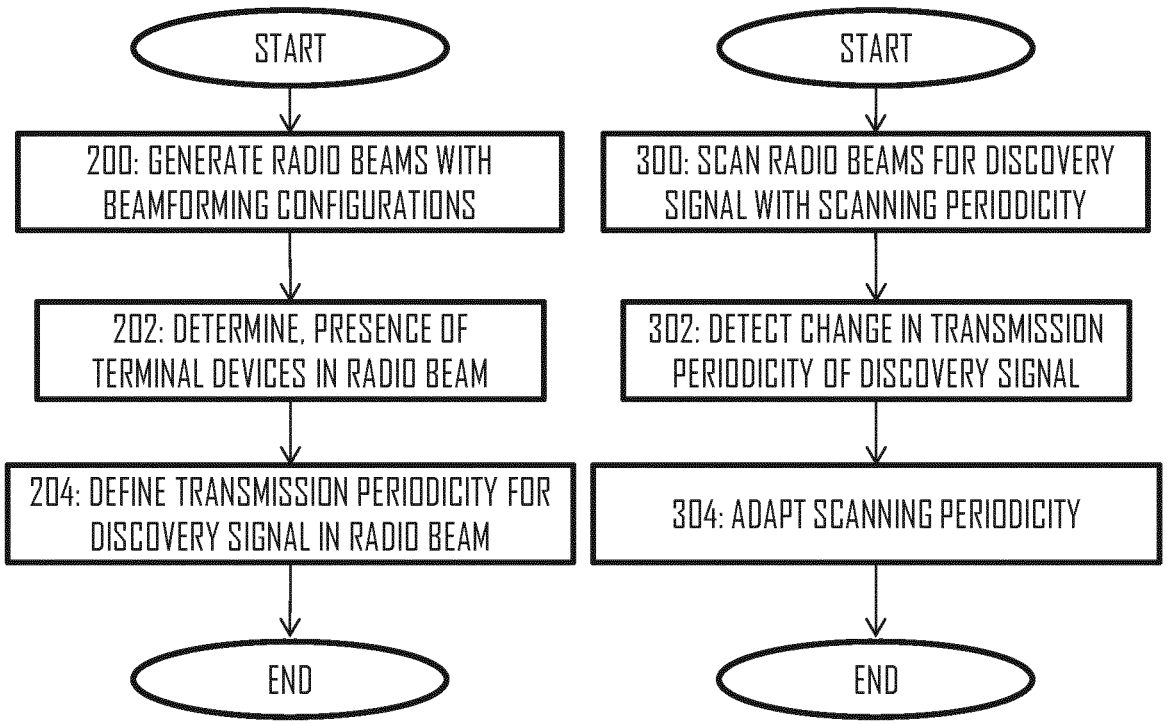
Fig 2
Fig 3

DISCOVERY SIGNAL TRANSMISSION IN CELLULAR SYSTEM

CROSS-REFERENCE TO RELATED APPLICATIONS

This application is a national stage entry of PCT Application No. PCT/EP2015/073506 filed Oct. 12, 2015, entitled "DISCOVERY SIGNAL TRANSMISSION IN CELLULAR SYSTEM" which is hereby incorporated by reference in its entirety.

TECHNICAL FIELD

The invention relates to wireless communications in a cellular communication system and, particularly, transmission of a discovery signal in a cell.

BACKGROUND

Increasing demand for wireless communication services is constantly increasing and, as a result, traffic in cellular communication systems is also increasing. Future cellular systems are expected to operate by using higher frequencies, e.g. frequencies above 3 Gigahertz or even millimeterwaves. Such evolution may require development in transmission techniques.

BRIEF DESCRIPTION

According to an aspect, there is provided the subject matter of the independent claims. Some embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following embodiments will be described in greater detail with reference to the attached drawings, in which FIG. 1 illustrates a wireless communication system to which embodiments of the invention may be applied;

FIGS. 2 and 3 illustrate processes for adapting discovery signal transmission/reception according to some embodiments of the invention;

DETAILED DESCRIPTION OF SOME EMBODIMENTS

Figure 4A:
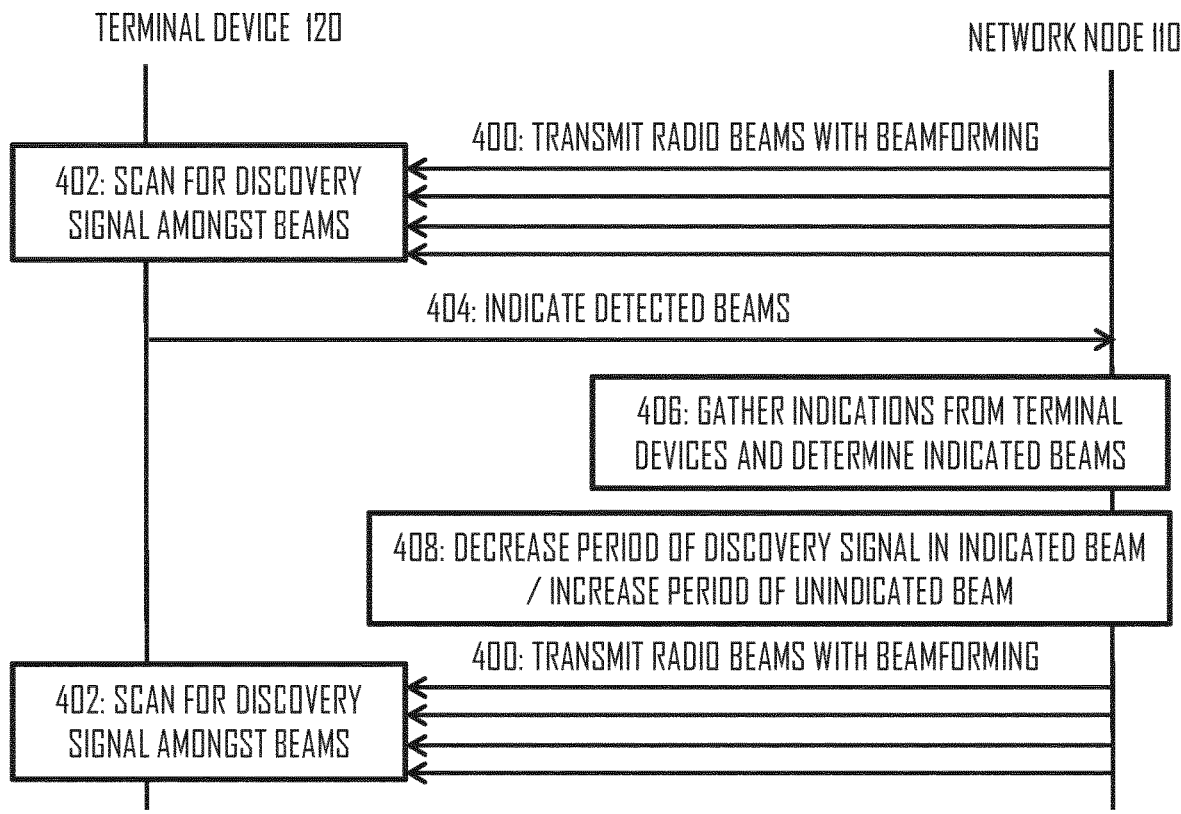
FIGS. 4A and 4B illustrate embodiments for determining a discovery signal transmission periodicity for a radio beam in a cell.

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as in at least one of the following: Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, and/or 5G system. The present embodiments are not, however, limited to these systems.

The embodiments are not, however, restricted to the system given as an example but a person skilled in the art may apply the solution to other communication systems provided with necessary properties. A 5G system is assumed to use multiple-input-multiple-output (MIMO) antenna techniques, a much higher number of base stations or nodes than the LTE (a so-called small cell concept), including macro sites operating in co-operation with smaller stations and perhaps also employing a variety of radio technologies for better coverage and enhanced data rates. 5G will likely be comprised of more than one radio access technology (RAT), each RAT being optimized for certain use cases and/or spectrum. 5G mobile communications will have a wider range of use cases and related applications including video streaming, augmented reality, different ways of data sharing and various forms of machine type applications, including vehicular safety, different sensors and real-time control. 5G is expected to have multiple radio interfaces (or at least variants of the baseline design) for different scenarios, for example below 6 GHz, cmWave and mmWave, and also being integradable with existing legacy radio access technologies, such as the LTE. The same may apply to certain specific scenarios such as Machine Type Communications (MTC) and Unlicensed band operation. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-radio-interface operability, such as below 6 GHz—cmWave, below 6GHz—cmWave—mmWave. One of the concepts considered to be used in 5G networks is network slicing in which multiple independent and dedicated virtual sub-networks (network instances) may be created within the same infrastructure to run services that have different requirements on latency, reliability, throughput and mobility. It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or cloud data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

Some embodiments of the present invention may be applied to a cellular communication system applying beamforming to transmissions in a cell. FIG. 1 illustrates an example of such a cellular communication system. Cellular radio communication networks, such as the Long Term Evolution (LTE), the LTE-Advanced (LTE-A) of the 3rd Generation Partnership Project (3GPP), or the predicted future 5G solutions, are typically composed of at least one network element, such as a network node 110, providing a cell 100. The cell 100 may be, e.g., a macro cell, a micro cell, femto, or a pico-cell, for example. The network node 110 may be an evolved Node B (eNB) as in the LTE and LTE-A, a radio network controller (RNC) as in the UMTS, a base station controller (BSC) as in the GSM/GERAN, or any other apparatus capable of controlling radio communication and managing radio resources within the cell 100. For 5G solutions, the implementation may be similar to LTE-A, as described above. The network node 110 may be a base station or an access node. The cellular communication system may be composed of a radio access network of network nodes similar to the network node 110, each controlling a respective cell or cells.

The network node 110 may be further connected via a core network interface to a core network 130 of the cellular communication system. In an embodiment, the core network 130 may be called Evolved Packet Core (EPC) according to the LTE terminology. The core network 130 may comprise a mobility management entity (MME) and a data routing network element. In the context of the LTE, the MME tracks mobility of the terminal devices 120 and carries out establishment of bearer services between the terminal devices 120 and the core network 130. In the context of the LTE, the data routing network element may be called a System Architecture Evolution Gateway (SAE-GW). It may be configured to carry out packet routing to/from the terminal devices 120 from/to other parts of the cellular communication system and to other systems or networks, e.g. the Internet.

As described above, the network node 110 may employ beamforming in transmission of radio signals in the cell 100. As known in the field of wireless communications, beamforming also called spatial filtering refers to directional transmission or reception. The steering of a radio beam may be achieved through digital and/or analog signal processing techniques and use of multiple antenna elements forming an antenna array. For example, the steering may be achieved by combining elements in a phased antenna array in such a way that signals at particular angles experience constructive interference while others experience destructive interference. Beamforming can be used in a transmitter and/or in a receiver in order to achieve spatial selectivity. The spatial selectivity results in improvement compared with omnidirectional transmission/reception, wherein the improvement is called transmit/receive gain. The network node may employ two types of radio beams: a first type of radio beam 114 that covers substantially the whole cell 100); and a second type of radio beam 112, 113 that covers a portion of the cell 100. When the cell 100 is a sector-type of cell amongst a plurality of sectors established by the network node 110, the first type of radio beam may be called a sector beam. Conventionally, cellular communication systems rely on the first type of radio beams for control plane transmissions (downlink synchronization, broadcast, antenna-port based common reference signals, etc.) and reception (e.g. random access channel, RACH). A system operating on higher carrier frequencies, such as a 5G system, may require higher antenna gain which may be achieved by using radio beams of the second type. In order to support cell sizes with inter-site distance of tens to hundreds meters, both common control and user plane related signaling may utilize radio beams that are narrower than the sector-wide radio beam. The second type of radio beam may provide a solution to such a situation.

In some embodiments, the network node may employ the radio beam of the first type in transmission of common control messages. The common control messages may be defined as messages addressed to a plurality of terminal devices or even all terminal devices located in the cell 100. The network node may employ the radio beam(s) of the second type in transmission of terminal-device-specific control messages, e.g. messages addressed to an individual terminal device located in the cell. In some embodiments, the radio beam of the first type may be used in transmission of the terminal-device-specific control messages, and/or the radio beams of the second type may be used in transmission of the common control messages.

In some embodiments, the beamforming is employed in connection with time-division duplexing (TDD) in a half-duplex manner. A transmission cycle may be divided in a time domain into a downlink cycle and an uplink cycle. The network node 110 may employ the beamforming for spatially filtered transmission during the downlink cycle and for spatially filtered reception during the uplink cycle. The network node may employ the same spatial filtering during the uplink cycle and the downlink cycle, for example, so the radio beams and associated coverage areas illustrated in FIG. 1 are applicable to the downlink cycle and the uplink cycle.

Due to transmission power budget or architecture limitations, the network node 110 may have a limited number of radio beams with the desired antenna gain available at a time. It means that the network node 110 may have to perform alternate transmission of the radio beams such that only a subset of the radio beams are active at a time.

The terminal device may scan the channel for a radio beam carrying a message from the network node 110 to the terminal device 120. When the terminal device 120 is dynamically scheduled downlink or uplink data, the terminal device 120 needs to check whether or not there is a scheduling grant transmitted by the network node 110. Link adaptation may be applied to the transmission of the control signaling carrying the scheduling grant to the terminal device. For example, in the LTE system the network node 110 may aggregate control channel elements (CCEs) based on a selected modulation and coding scheme (MCS) by aggregating CCEs by the factor of one, two, four or eight in an open-loop manner. The number of CCEs needed may depend on channel-coding rate which defines the number of transmitted symbols. As the number of CCEs is variable and it may not be signaled by the network node 110, the terminal device may perform blind detection to determine the number of CCEs used for the signaling. In addition, the control channel may have multiple formats and the format is not necessarily known by the terminal device a priori. The number of different configurations for the CCEs or, more generally, a message addressed to the terminal device 120 may define a search space from which the terminal device is scanning for the message. The search space may define scanning configurations for the terminal device 120. Different scanning configurations may define different link adaptation configurations such as candidate MCSs, different radio beams associated with the terminal device, and/or one or more formats of the message. As can be seen, as the number of different variables increases in the search space, the number of different scanning configurations increases exponentially. Accordingly, reduction of the search space may be advantageous. Also, adaptation of the search space to the current operating environment may also be advantageous.

For the purpose of cell discovery, for example, the network node 110 may transmit one or more discovery signals in the radio beams of the cell 100 or in some of the radio beams of the cell. The discovery signal may comprise at least one of the following signals: a synchronization signal, a reference signal used for channel measurements—the reference signal may be beam-specific—a system information message, a beam identifier, and a cell identification message. All radio beams may comprise the same synchronization signal. One or more discovery signals transmitted in the cell may provide the terminal device with information enabling detection of the cell and access to the cell 100. It may also facilitate radio resource management and/or channel state information measurements for the terminal device 120. The discovery signal may be transmitted periodically, as described below. In some situations, the terminal device 120 may be configured to scan for the discovery signal with a determined scanning periodicity. The terminal device may be in a mode where it searches for the synchronization signal or where it searches for the system information of the cell after synchronization.

Another type of discovery signal transmitted in the cell 100 may enable detection of another terminal device. In such an embodiment, the discovery signal may be transmitted by a terminal device advertising its presence to other terminal devices. Such a scheme may be called device-to-device discovery or machine-to-machine discovery referring to discovery between two terminal devices.

Further control of management signals may be transmitted in the cell, and some of the signals may be periodic. Principles of the embodiments described below may be directly applicable to virtually any periodic control or management signal or message transmitted in the cell.

The number of radio beams having different beamforming configurations in the cell may be over ten, e.g. dozens or even hundreds. The number of terminal devices in the cell 100 may be variable and there are several occasions where no terminal devices are located in a coverage area of a radio beam. In such situations, it is advantageous either to save resources or to direct resources to those radio beams that comprise terminal devices. FIG. 2 illustrates such an embodiment.

Referring to FIG. 2, a process performed by a network node comprises: generating (block 200) a plurality of radio beams in a cell, wherein said plurality of radio beams comprise a plurality of beamforming configurations, and wherein at least one radio beam comprised in the plurality of radio beams comprises a discovery signal transmission; determining (block 202), for the at least one radio beam, whether or not at least one terminal device is located in a coverage area of the at least one radio beam; and defining (block 204) a transmission periodicity of the discovery signal transmission on the basis of said determining.

As described above, the transmission periodicity of the discovery signal transmitted in a radio beam may be adapted to the presence of one or more terminal devices in the coverage area of the radio beam. Accordingly, the terminal device 120 may adapt the scanning periodicity used in scanning for the discovery signal. FIG. 3 illustrates such an embodiment.

Referring to FIG. 3, a process performed by the terminal device comprises: scanning (block 300) at least one radio beam in a cell for a discovery signal with a scanning periodicity proportional to a transmission periodicity of the discovery signal; detecting (block 302) change in the transmission periodicity of the discovery signal in in the at least one radio beam; and adapting (block 304) the scanning periodicity according to the detected change in the transmission periodicity.

Embodiments described above enable adaptation of the periodicity of the discovery signal transmission. In an embodiment, a period may be increased resulting in less discovery signal transmissions when no terminal devices are detected in the coverage area of the radio beam. This enables savings in transmission resources and signalling overhead. On the other hand, the period may be decreased resulting in more frequent discovery signal transmissions when one or a plurality of terminal devices are detected in the coverage area of the radio beam. This enables lower latencies in the service of the terminal devices. This may improve efficiency of resource usage. Accordingly, the terminal device may adapt the scanning periodicity and gain advantage of efficient use of resources in the terminal device.

Figure 4B:
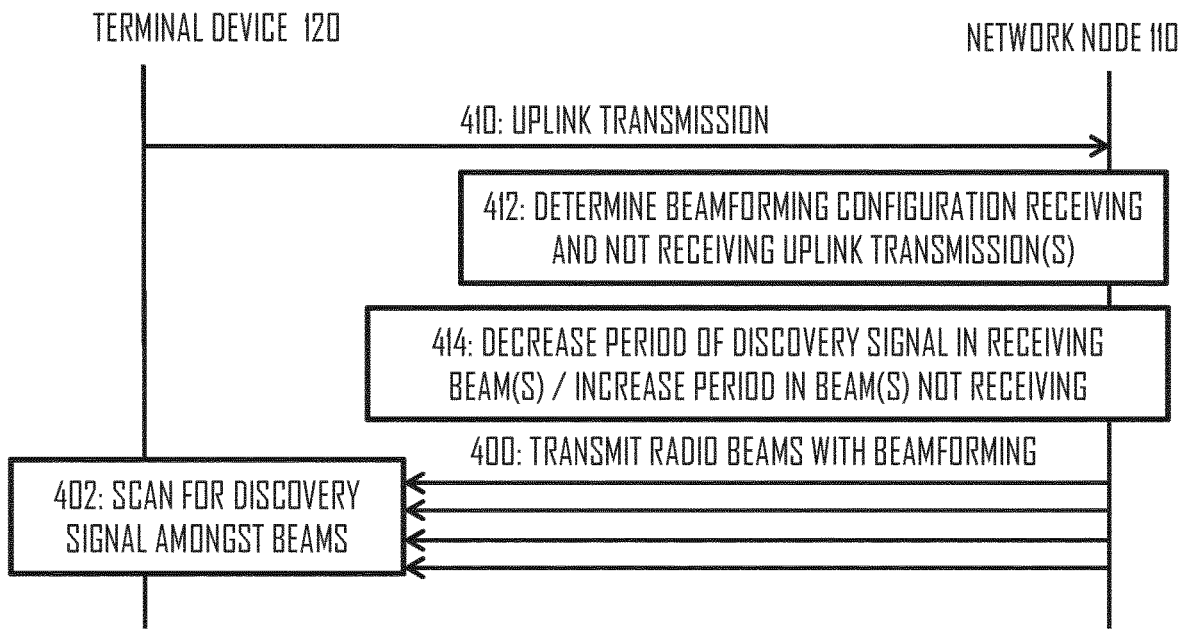

Let us now describe some embodiments for determining the presence of the terminal devices in the coverage area of the radio beams with reference to FIGS. 4A and 4B. In the embodiments of FIGS. 4A and 4B, the network node 110 determines the presence of the terminal devices in the coverage area of a radio beam on the basis of one or more uplink messages received from the terminal devices.

FIG. 4A illustrates an embodiment where the network node 110 determines the presence of the terminal devices in the coverage area of a radio beam on the basis of responses received from the terminal devices. Referring to FIG. 4A, the network node may transmit the radio beams in the cell with the different beamforming configurations in step 400. One or more of the radio beams may comprise the discovery signal transmitted with a transmission periodicity. In block 402, the terminal device 120 may scan for the discovery signals with a scanning periodicity. The scanning periodicity may comply with the transmission periodicity of the discovery signal(s). The terminal device may determine the transmission periodicity on the basis of a signal received from the network node, as described below.

As described above, a discovery signal may comprise a beam identifier which is unique to a radio beam amongst the plurality of radio beams and allows the identification of the radio beam. Upon detecting the discovery signal carrying the beam identifier in block 402, the terminal device 120 may generate an uplink message comprising the beam identifier of the detected beam and transmit the uplink message to the network node in step 404. The same procedure of blocks 402 and 404 may be performed with one or more other terminal devices in the cell 100. In block 406, the network node gathers the uplink messages received from the terminal devices and determines, on the basis of the received uplink messages, the radio beams having at least one terminal device in their coverage area. In more detail, if a received uplink message comprises a beam identifier, the network node may determine that a terminal device is located in the coverage area of the radio beam.

In block 408, the network node adapts the transmission periodicities of the discovery signals in the radio beams on the basis of block 406. For example, if none of the received uplink messages indicates a given radio beam, the network node may set the transmission periodicity of the discovery signal in that beam to a maximum transmission period associated with the longest period. On the other hand, if one or more uplink messages indicate a radio beam, the network node may select a transmission periodicity which is shorter than the maximum transmission period. In this manner, the network node may adapt the transmission periodicities of the discovery signals independently for each radio beam. As the terminal devices are mobile, the network node may adapt to the mobility of the terminal devices between the radio beams by adapting the transmission periodicity of the discovery signals accordingly. In the lower step 400, the network node may transmit the radio beams again, now by applying the new transmission periodicities of the discovery signals selected in block 408.

In an embodiment of FIG. 4A, the terminal device is scanning for a downlink reference signal in block 402. The scanning may comprise measuring the downlink reference signal, e.g. reception strength of the reference signal. Accordingly, the terminal device may adapt measurement periodicity to the transmission periodicity of the discovery signal. The measurements may refer to physical layer (Layer 1), link layer (Layer 2 including medium access control and radio link control, for example), and/or radio resource control layer (Layer 3) measurements. In this embodiment, the uplink message transmitted in step 404 may comprise an uplink measurement report indicating a measurement result for said measurements. The measurement result may be used as a channel state indicator indicating a quality of a radio channel between the network node and the terminal device.

In an embodiment, a radio beam carrying the discovery signal also comprises an uplink transmission resource associated with the discovery signal. The uplink transmission resource may be periodic and have the same periodicity as the discovery signal in the radio beam. As a consequence, the network node is capable of receiving the uplink messages from the terminal devices with the same periodicity as it transmits the discovery signal.

FIG. 4A is based on the terminal device detecting a radio beam and responding to the network node with a message indicating that the terminal device has detected the radio beam. FIG. 4B illustrates an embodiment where the terminal device performs an arbitrary uplink transmission and the network node determines, on the basis of reception beamforming configuration, a radio beam having the terminal device in its coverage area. The process of FIG. 4B may be based on applying the same beamforming configuration in reception and in transmission in the network node. Referring to FIG. 4B, the terminal device performs an uplink transmission in step 410. The uplink transmission may comprise an uplink reference signal or an uplink control message, for example. Similarly, one or more other terminal devices located in the cell may perform uplink transmissions. In step 410, the network node may carry out reception of uplink signals with a plurality of different reception beamforming configurations. Each reception beamforming configuration may be associated with one of the radio beams, and the reception beamforming configurations may correspond to the plurality of different beamforming configurations used in the transmissions by the network node. In block 412, the network node 110 may determine the reception beamforming configuration(s) with which at least one uplink message has been received.

In block 414, the network node adapts the transmission periodicities of the discovery signals in the radio beams on the basis of block 412. For example, if no uplink messages was received with a given reception beamforming configuration within a determined time duration, the network node may set the transmission periodicity of the discovery signal in the radio beam corresponding to the reception beamforming configuration to a maximum transmission period associated with the longest period. On the other hand, if one or more of the reception beamforming configurations is capable of receiving an uplink message, the network node may select a transmission periodicity which is shorter than the maximum transmission period for radio beam(s) associated with those one or more reception beamforming configurations. In this embodiment too, the network node may adapt the transmission periodicities of the discovery signals independently for each radio beam. As the terminal devices are mobile, the network node may adapt to the mobility of the terminal devices between the radio beams by adapting the transmission periodicity of the discovery signals accordingly. In the lower step 400, the network node may transmit the radio beams again, now by applying the new transmission periodicities of the discovery signals selected in block 408.

In an embodiment, the embodiments of FIG. 4A and 4B are both applied, e.g. the network node may determine the locations of the terminal devices with respect to the radio beams according to the embodiment of FIG. 4A and according to the embodiment of FIG. 4B.

Yet another embodiment employs statistics gathered by the network node and/or another network node in determining the transmission periodicities of the discovery signals. For example, the network node may gather history data representing locations of the terminal devices in the coverage areas of the radio beams and use the history data in determining the transmission periodicities for the discovery signals. The history data may represent temporal locations of the terminal devices, e.g. within a day, within a work week, or within a week. As a practical example, an office building in which the network node provides the cell may comprise a first area covered by a first set of radio beams and a second area covered by a second set of radio beams. During office hours, the history data may show that terminal devices are present in the coverage areas of all radio beams and the history data shows no predictability of the mobility of the terminal devices. However, outside office hours the history data may show that no terminal devices are located within the coverage area of the first set of radio beams, e.g. in office posts or conference rooms, while random or regular presence of at least one terminal device is located in the coverage area of the second set of radio beams, e.g. in a security post. Accordingly, the network node may employ the long transmission period of the discovery signals in the first set of radio beams and a short(er) transmission period of the discovery signals in the second set of radio beams outside the office hours. During the office hours, the shorter transmission period may be applied in all radio beams or the transmission periodicity may be determined according to the embodiment of FIG. 4A or 4B, for example.

In yet another embodiment, the network node may employ external information on the locations of the terminal devices. Such an external information may comprise information of a certain event in a determined location, wherein the event is anticipated to be associated with high density of terminal devices. An example of such an event is a fair or a sports event such as Olympic games. The network node may then select the transmission periodicity on the basis of such external information, e.g. by selecting a short(er) transmission period of discovery signals for radio beams having the location of the event in their coverage area. In other radio beams of the cell, a longer period may be applied, thus enabling focusing resources to those radio beams that are anticipated require high capacity.

In yet another embodiment, the network node may employ a positioning system in determining the locations of the terminal devices. Such a positioning system may employ a global navigation satellite system (GNSS) such as Global Positioning System (GPS), Galileo, GLONASS, BeiDou, DORIS, or GAGAN.

Figure 5:
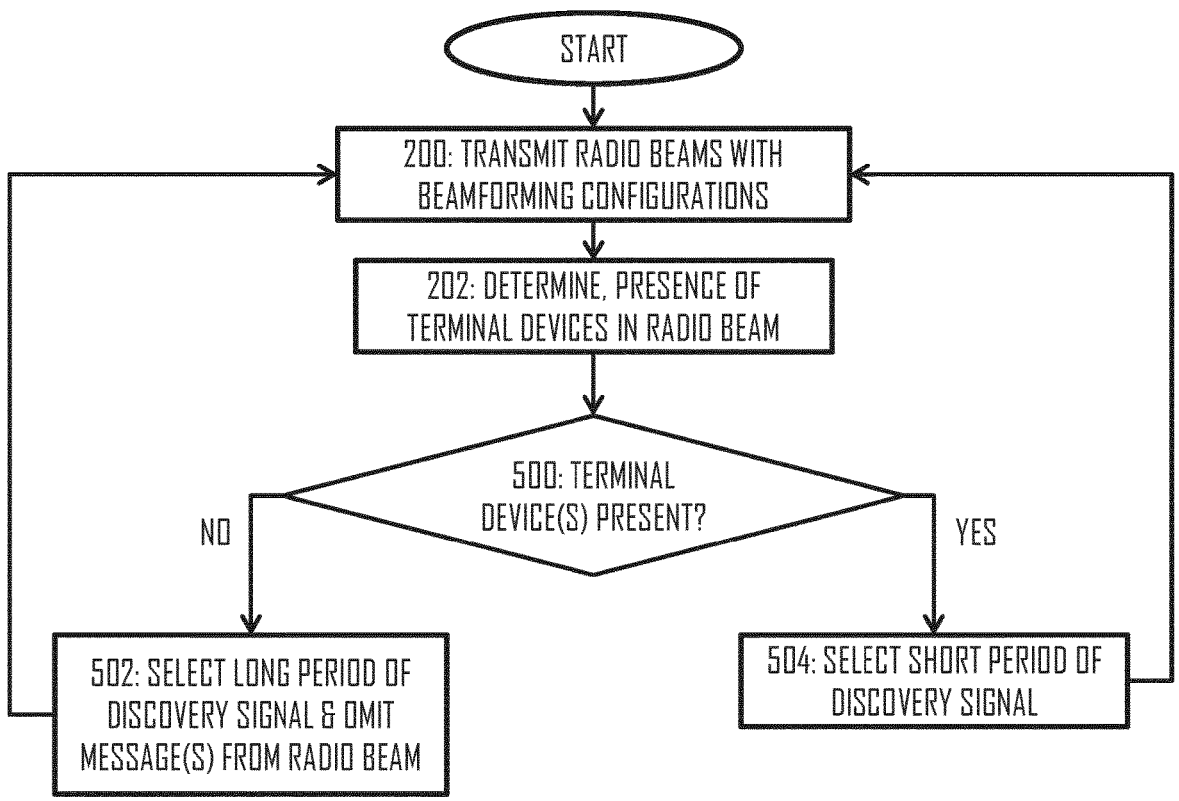
FIG. 5 illustrates a process for determining the discovery signal transmission periodicity in a network node according to an embodiment of the invention.

FIG. 5 illustrates an embodiment of the procedure applicable to the embodiments of FIG. 2, 4A, and/or 4B and executed by the network node. Referring to FIG. 5, blocks 200 and 202 are described above and FIGS. 4A and 4B describe embodiments of block 202. Block 202 and subsequent blocks 500, 502, 504 may be carried out for each radio beam carrying a discovery signal. Some of the radio beams transmitted by the network node not necessarily carry a discovery signal. In block 500, the network node determines for the radio beam under examination whether or not at least one terminal device has been detected in the coverage area of the radio beam. Upon determining that no terminal devices have been detected in block 500, the process may proceed to block 502 in which the network node select a long transmission period for a discovery signal transmitted in the radio beam. Additionally, the network node may omit transmission of at least one message in the radio beam as a result of the decision made in block 500. For example, the network node may omit transmission of at least one of the following downlink messages in the radio beam having no terminal devices in its coverage area: a terminal-device-specific control message, terminal-device-specific data, at least one type of common control message common to a plurality of terminal devices, at least one downlink reference signal. As a consequence, less message types are transmitted in a radio beam or radio beams, thus further reducing signalling overhead in the radio beams having no terminal devices in their coverage areas. Similarly, upon detecting that a certain radio beam is transmitted with the maximum transmission period, the terminal device may determine that the radio beam does not comprise information relevant to the terminal device and the terminal device may remove the radio beam from a list of candidate radio beams from which the terminal device searches for a control message, for example.

On the other hand, upon determining in block 500 that one or more terminal devices are located in the coverage area of the radio beam, the process may proceed to block 504 in which the network node selects a short transmission period for the discovery signal. If in previous examination of the radio beam, no terminal devices were detected in the coverage area of the radio beam, block 504 may comprise shortening the period and adding one or more messages for transmission in the radio beam. The one or more messages may comprise one or more of the message types described above in connection with block 502.

From block 502/504, the process may return to block 200.

In an embodiment of block 502, the network node excludes all other control and data messages from the radio beam except for the discovery signal. In other words, when the process returns to block 200 from block 502, the radio beam transmitted by the network node comprises only the discovery signal transmitted with the maximum transmission period. Referring back to FIG. 1, the network node may then transmit only a discovery signal with the maximum transmission period in radio beam 112 and further transmit a discovery signal more frequently and further control messages and/or data in the radio beam 113 where the terminal device 120 is located.

In an embodiment, when the network node selects the maximum transmission period for the discovery signal transmissions in a radio beam, the network node may put the radio beam into a discontinuous transmission state in which the network node transmits only the discovery signal or only a reduced set of discovery signals in the radio beam. As a consequence, the radio beam having no terminal devices in its coverage area may be put into a discovery-only state in which it is used only to advertise the presence of the cell and the radio beam.

In an embodiment, the network node may determine the discovery signal transmission periodicity separately for a plurality of different types of discovery signals transmitted in a radio beam. Different types of discovery signals may have different requirement for the maximum transmission period or, in general, transmission periodicity. For example, a transmission period of the reference signal may be upper-bounded by channel coherence time. For example, a radio beam having at least one terminal device in its coverage area may employ a reference signal periodicity of 2 milliseconds (ms), synchronization signal periodicity of 10 ms, and physical broadcast channel periodicity of 20 ms. A radio beam having no terminal devices in its coverage area may employ 80 ms periodicity for all discovery signals. Further in an embodiment, only every second discovery signal transmission may comprise the physical broadcast channel, and the discovery signal may comprise an indicator indicating whether or not the physical broadcast channel is included in the discovery signal. Accordingly, the transmission periodicity of the physical broadcast channel may be integer multiple of the transmission periodicity of the synchronization signal.

In an embodiment, the network node is configured to scale the discovery signal transmission periodicity according to the number of terminal devices located in the coverage area of the radio beam. The network node may employ more than two periodicities, each periodicity associated with the different number of terminal devices detected to be located within the coverage area. The higher number of detected terminal devices may be associated with the shorter period of the discovery signal transmission.

Further in an embodiment, the discovery signal transmissions in different radio beams of the cell may be aligned such that the network node will not transmit contradictory information, e.g. one radio beam indicating absence of the physical broadcast channel while another radio beam indicating presence of the physical broadcast channel.

Figure 6:
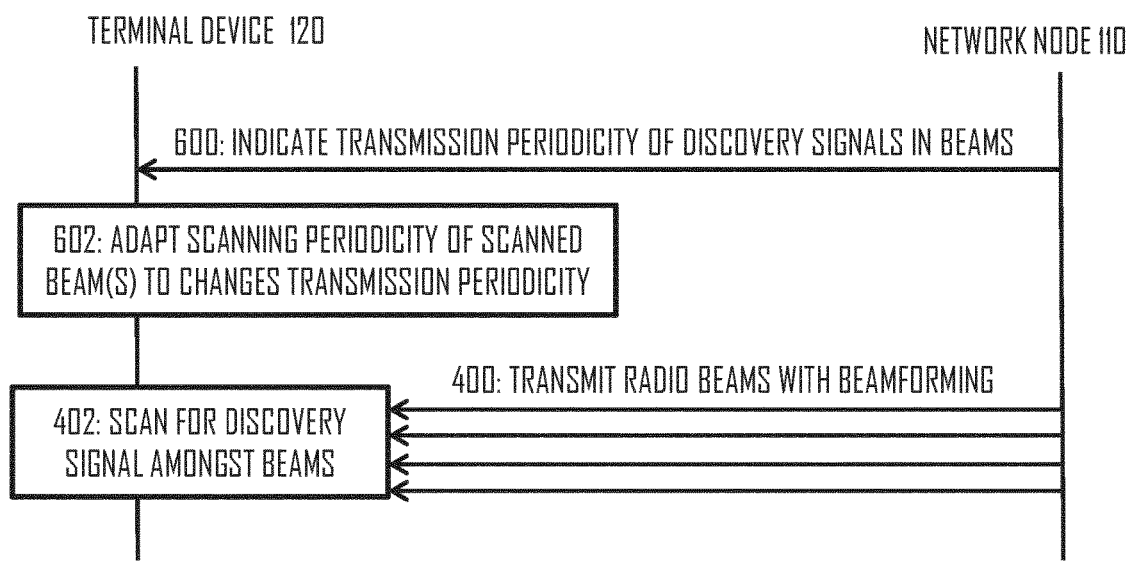
FIG. 6 illustrates a procedure for indicating the discovery signal transmission periodicity according to an embodiment of the invention.

FIG. 6 illustrates an embodiment for enabling the terminal device 120 to align the scanning and/or measurement periodicity to the transmission periodicity of the discovery signals per radio beam. The procedure is equally applicable to an embodiment where the terminal device performs blind detection of a control message transmitted with a determined transmission periodicity. The control message may be different from the discovery message. Referring to FIG. 6, upon determining the transmission periodicities of the discovery signals for the plurality of radio beams, the network node 110 may generate a notification message indicating the determine transmission periodicities for those radio beams that carry a discovery signal. The notification message may comprise, for each radio beam carrying the discovery signal, an information element indicating the transmission periodicity of the discovery signal. In another embodiment, the notification message carries a bitmap indicating jointly the transmission periodicities of the discovery signals for a plurality of radio beams. In these embodiments, the notification message may be transmitted in step 600 in a plurality of radio beams of the second type (covering only a part of the cell) or in a radio beam of the first type (covering the whole cell). In yet another embodiment, a separate notification message may be generated for each radio beam and transmitted in each radio beam. Accordingly, the information on the transmission periodicity of the discovery signal for a radio beam is carried only by the radio beam itself, e.g. in the discovery signal.

Upon receiving the notification message in step 600, the terminal device determines the transmission periodicity of at least one discovery signal and adapts scanning periodicity to the transmission periodicity (block 602). The terminal device 120 may employ the scanning periodicity in the time interval it uses for scanning for the discovery signal. If the terminal device is not able to detect the discovery signal within the time interval matching with the scanning periodicity, the terminal device may determine that it is not capable of detecting the radio beam and start searching for another discovery signal.

In an embodiment, the network node transmits the notification message (step 600) periodically. In another embodiment, the network node transmits the notification message (step 600) when at least one transmission periodicity changes. Yet another embodiment is the combination of these two embodiments.

The embodiments described above relate to periodic transmission of the discovery signal in a radio beam, wherein the periodicity may be adjusted according to the presence of the terminal devices in the coverage area of the radio beam. A boundary for the maximum duration of the period may be defined by the maximum transmission period, and the maximum transmission period may be defined in a specification of the system. In another embodiment illustrated in FIG. 7, the network node may be provided with capability of transmitting ad hoc discovery signals that are not necessarily bound by the periodicity. Transmission of such ad hoc discovery signals may be called opportunistic discovery signals transmissions.

Figure 7:
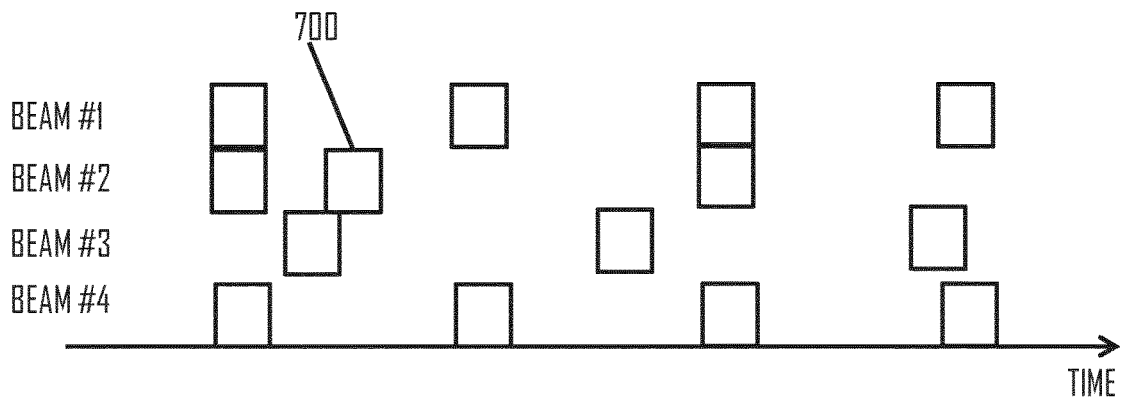
FIG. 7 illustrates opportunistic discovery signal transmissions according to an embodiment of the invention.

Referring to FIG. 7 illustrating discovery signal transmissions in four radio beams, wherein a discovery signal transmission is represented by a rectangle. The reader is advised that the number of beams is merely exemplary and the total number of radio beams transmitted with the different beamforming configurations in the cell may be much higher. Additionally, the size of the rectangles is for the sake of illustration, and the discovery signal transmissions may consume less time resources than illustrated in FIG. 7. As illustrated in FIG. 7, the periodicity of discovery signal transmissions may be determined separately for each radio beam and, accordingly, different radio beams transmitted at the same time may apply different periodicities.

Additionally, the network node may carry out opportunistic signal transmission by transmitting, in a radio beam, a discovery signal 700 offset from the periodic discovery signal transmissions currently applied to the radio beam. In another embodiment, the opportunistic discovery signal 700 differs from the periodic discovery signal in another manner, e.g. by having different contents and/or a different identifier. For example, the opportunistic discovery signal may comprise an indicator indicating that the discovery signal is related to opportunistic transmission. The indicator may be transmitted in a field on a physical broadcast channel, for example. It may be also indicated implicitly by means of specific (sub)frame timing.

In an embodiment, the network node enables the opportunistic discovery signal transmissions in a radio beam currently employing a long period for the periodic discovery signal transmissions, e.g. the maximum transmission period. Accordingly, the opportunistic discovery signal transmissions may be disabled for at least a radio beam employing the shortest periodicity for the periodic discovery signal transmissions.

The network node may trigger the transmission of the opportunistic discovery signal upon detecting an event indicating potential presence of a terminal device in a coverage area of a radio beam and, therefore, expedite cell discovery in such a terminal device. Let us consider handover as an example of the event triggering the opportunistic transmission. A terminal device served by a first network node operating a first cell may report neighbor cell measurements to the first network node. The terminal device may detect a radio beam transmitted by a second network node operating a second cell. The second cell may be a neighbor cell of the first cell, or it may be a cell further away from the first cell, e.g. a local area cell within a third cell neighboring the first cell. Upon detecting and measuring the radio beam, the terminal device may report the measurement result(s) and a beam identifier of the radio beam to the first network node. The first network node may determine, on the basis of the received report, that the terminal device shall be handed over to the second cell. As a consequence, the first network node may transmit a handover message or multiple handover messages to the second network node. The handover message may comprise control signaling related to the handover procedure in which the terminal device is handed from the first network node to the second network node. The message(s) may comprise the beam identifier. Upon receiving the beam identifier in connection with the handover, the second network node may detect that the terminal device is capable of detecting the radio beam associated with the received beam identifier. This detection may trigger the opportunistic discovery signal transmission in the radio beam, thus enabling expedited cell discovery and provision of discovery information to the terminal device.

The adjustable periodicity of the discovery signal transmissions releases resources or occupies resources whenever the periodicity is changed. This feature may be taken into advantage and used in improving spectral efficiency in the radio beam carrying the discovery signal and/or in adjacent radio beams. Let us assume that a time-frequency resource allocated to a radio beam may consume the same time-frequency resource from adjacent radio beams as well. The reason may be interference avoidance in a terminal device capable of detecting the radio beam and the adjacent radio beam(s).

In an embodiment, the network node may associate an uplink transmission resource with each discovery signal transmission. For example, a broadcast control channel comprised in the discovery signal may comprise an information element indicating an uplink transmission resource associated with the discovery signal. This enables the terminal device to access the network quickly upon detecting the discovery signal. The uplink resource may follow the discovery signal transmission. The uplink resource may be a random access channel resource. The periodic and/or opportunistic discovery signal transmissions may all be associated with an uplink resource that follows the discovery signal transmission. The uplink resource may be between two consecutive discovery signal transmissions. The uplink resource may be closer to the earlier of the two consecutive discovery signal transmissions.

Figure 8:
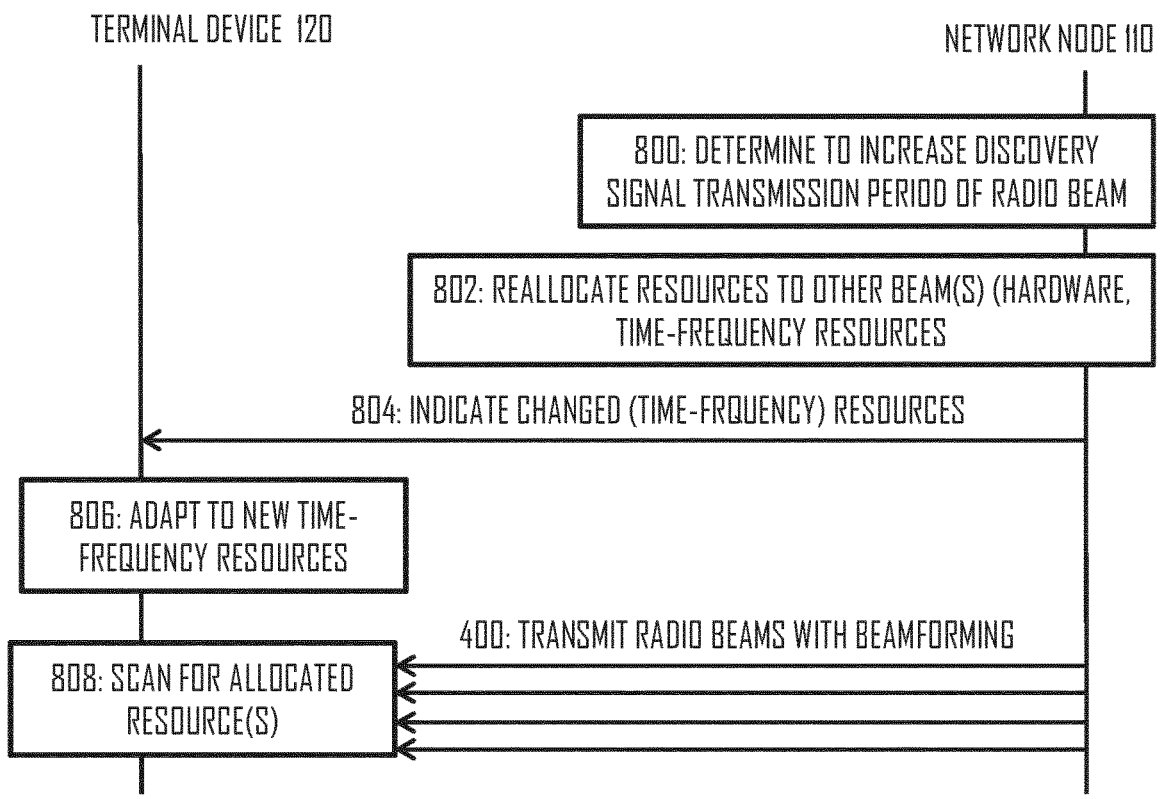
FIG. 8 illustrates a process for reallocating resources released when the discovery signal transmission periodicity is adjustable according to an embodiment of the invention.

In an embodiment, the network node reallocates resources released as a result of increasing the length of a discovery signal transmission period. The reallocated resources may be time-frequency resources comprised in the radio beam carrying the discovery signal and/or in at least one adjacent radio beam. FIG. 8 illustrates a procedure in such an embodiment. Referring to FIG. 8, the network node may determine in block 800 to increase a discovery signal transmission period of a radio beam. Block 800 may be executed as a result of reduced presence of terminal devices in the coverage area of the radio beam. As the period is increased, the discovery signal transmission is carried out less frequently and, thus, the increase releases resources for reallocation. In block 802, the network node allocates resources to one or more other radio beams.

In an embodiment, the reallocated resource is a time-frequency resource, and the released time-frequency resource may be reallocated as a time-frequency resource for data transmission associated with a terminal device. In step 804, the network node transmits an allocation message allocating the reallocated time-frequency resources to the terminal device. The allocation message may be a downlink grant message indicating the time-frequency resources. In some embodiments, such an ad hoc reallocation may require reconfiguration of parameters in the network node and/or the terminal device. For example, the terminal device may require new rate matching parameters that match with the increased rate caused by the reallocation of new time-frequency resources. The network node may indicate such rate matching parameters in the allocation message in step 804. In block 806, upon receiving the allocation message, the terminal device adapts to the new time-frequency resources, e.g. by applying the new rate matching parameters. In step 400, the network node transmits the radio beams comprising the data allocated to the terminal device in step 804. In block 808, the terminal device extracts the data from the allocated time-frequency resources with the adapted parameters.

In another embodiment, the resource is a hardware resource. For example, a radio transceiver unit may be reallocated for use in another radio beam, or the radio transceiver unit may be put into a power-save mode to reduce power consumption. As described in greater detail below with reference to FIG. 11, a radio transceiver unit may be configured to manage a radio beam. When the radio beam is not transmitting/receiving, the radio transceiver unit may be reallocated to another radio beam, thus increasing capacity and/or communication quality in that radio beam.

Figure 9:
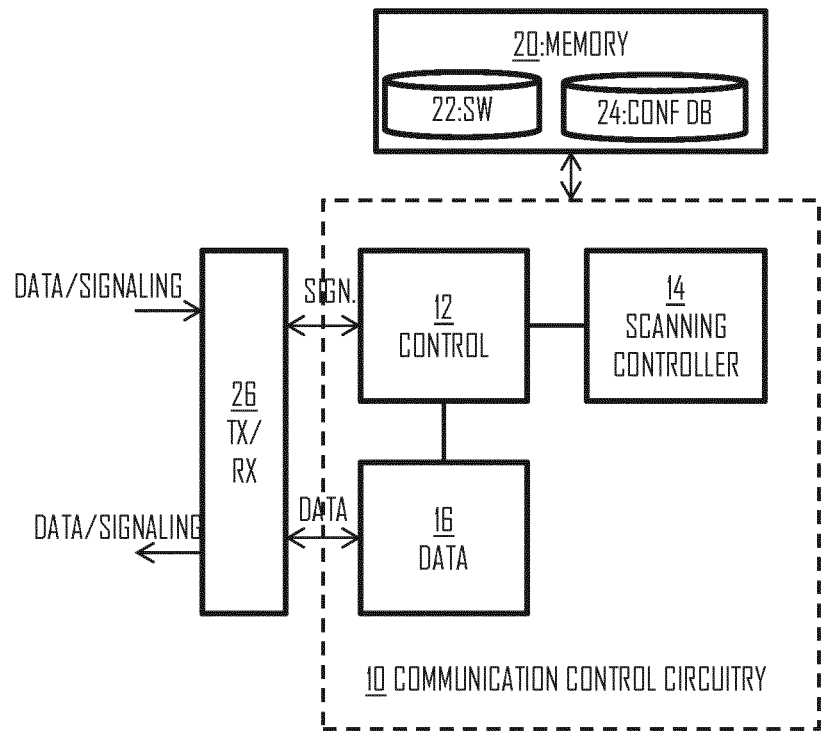
FIGS. 9 to 11 illustrate block diagrams of structures of apparatuses according to some embodiments of the invention.
Figure 10:
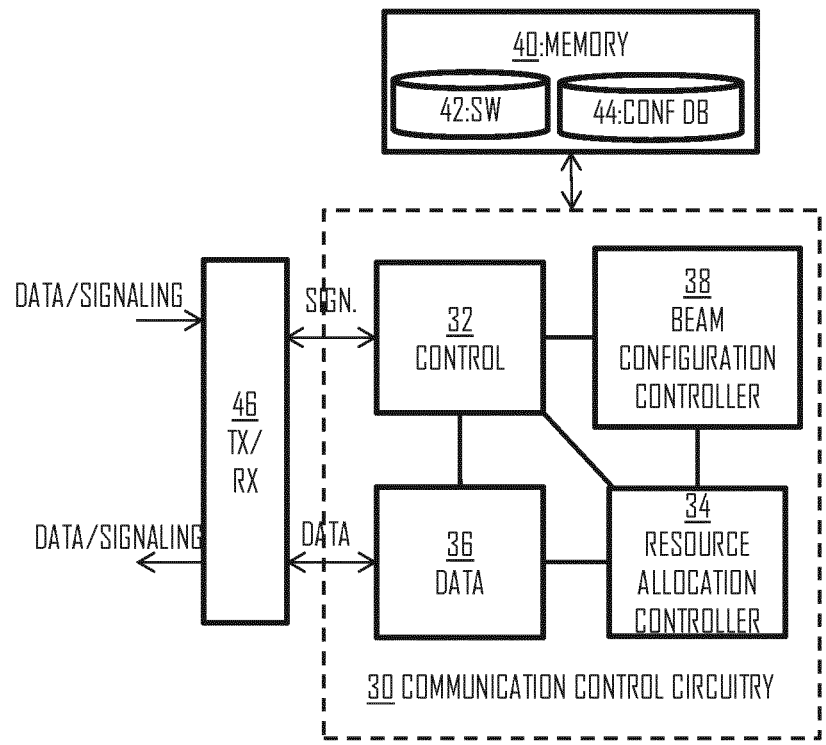
Figure 11:
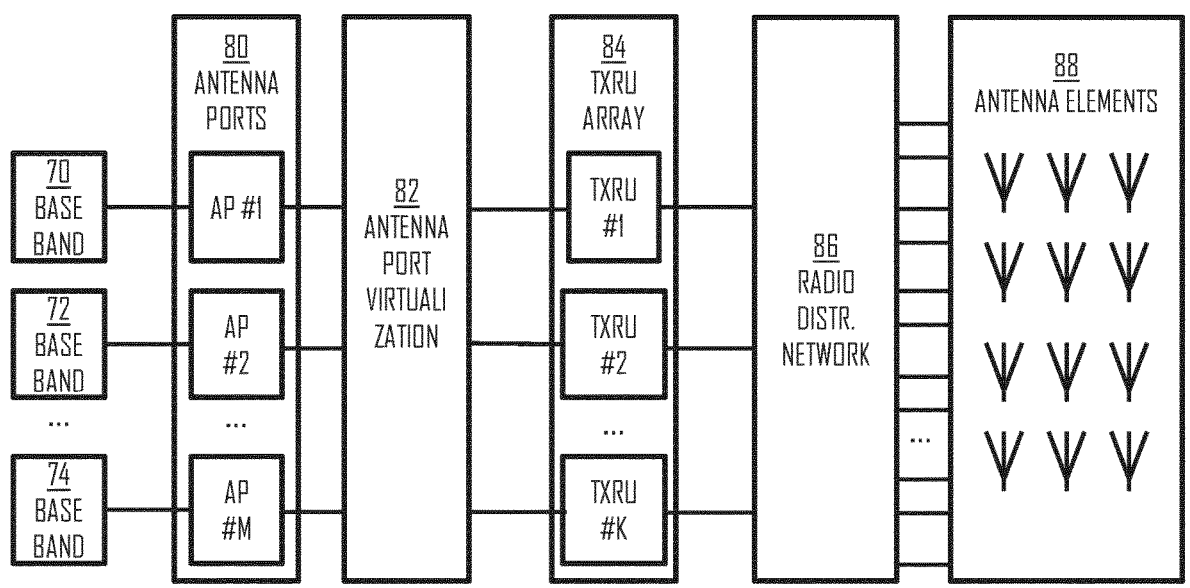

FIGS. 9 to 11 provide apparatuses according to some embodiments of the invention. FIG. 9 illustrates an apparatus configured to carry out the functions described above in connection with the terminal device 120. FIG. 10 illustrates an apparatus configured to carry out the functions described above in connection with the network node 110. Each apparatus may comprises a communication control circuitry 10, 30 such as at least one processor, and at least one memory 20, 40 including a computer program code (software) 22, 42 wherein the at least one memory and the computer program code (software) are configured, with the at least one processor, to cause the apparatus to carry out any one of the embodiments described above in connection with the respective apparatus.

The memories 20, 40 may be implemented using any suitable data storage technology, such as semiconductor based memory devices, flash memory, magnetic memory devices and systems, optical memory devices and systems, fixed memory and removable memory.

The apparatuses may further comprise a communication interface (TX/RX) 26, 46 comprising hardware and/or software for realizing communication connectivity according to one or more communication protocols. The communication interface may provide the apparatus with communication capabilities to communicate in the cellular communication system, e.g. between the network node 110 and the terminal device 120. The communication interface may comprise standard well-known components such as an amplifier, filter, frequency-converter, (de)modulator, and encoder/decoder circuitries and one or more antennas. The communication interface 26, 46 may comprise radio interface components providing the apparatus with radio communication capability in the cellular communication system.

Each memory 20, 40 may store a configuration database 24, 44. The configuration database 24 may store the configurations for one or more radio beams. As described above, the configuration database 24 of the terminal device may store a scanning configuration for at least one radio beam, e.g. a scanning periodicity. The configuration database 44 of the network node may store transmission parameters for the radio beams transmitted by the network node. The transmission parameters may define the discovery signal transmission periodicity parameters for the radio beams.

In an embodiment of FIG. 10, at least some of the functionalities of the network node 110 may be shared between two physically separate devices, forming one operational entity. Therefore, the apparatus may be considered to depict the operational entity comprising one or more physically separate devices for executing at least some of the above-described processes. Thus, the apparatus of FIG. 10, utilizing such a shared architecture, may comprise a remote control unit (RCU), such as a host computer or a server computer, operatively coupled (e.g. via a wireless or wired network) to a remote radio head (RRH) located at a base station site. In an embodiment, at least some of the described processes of the network node may be performed by the RCU. In an embodiment, the execution of at least some of the described processes may be shared among the RRH and the RCU. In such a context, the RCU may comprise the components illustrated in FIG. 10, and the communication interface 46 may provide the RCU with the connection to the RRH. The RRH may then comprise radio frequency signal processing circuitries and antennas, for example.

In an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

Referring to FIG. 9, the apparatus may comprise a control circuitry 12 carrying out control plane signalling with one or more network nodes operating cells in the cellular communication system, e.g. the network node 110. The control circuitry may also carry out any higher level signalling used in communication between the terminal device and the core network 130, e.g. authentication, service requests, and integrity protection. The control circuitry 12 may carry out transmission and reception of control messages in the terminal device. The control circuitry may carry out signalling related to steps 404, 410, 600, 804 in the terminal device 120, for example. The control circuitry may further carry out the above-described scanning for the discovery signals, e.g. blocks 300, 402. The control circuitry may further carry out the above-described measurement of the radio beams, estimation of channel quality on the basis of the measurements, and uplink transmission of a measurement report indicating the channel quality.

The apparatus may further comprise a data communication circuitry 16 configured to carry out transmission and reception of payload data in resources allocated to the terminal device in the cell 100.

The apparatus may further comprise a scanning controller 14 configured to manage the above-described scanning for the discovery signals in the terminal device. The scanning controller may, for example, determine the scanning periodicity for the radio beams on the basis of detected transmission periodicities of the discovery signals in the radio beams the apparatus searches for. The scanning controller may, for example, receive the message in step 600 and configure the control circuitry 12 to employ the scanning periodicity determined in block 602.

Referring to FIG. 10, the apparatus may comprise a control circuitry 32 carrying out control plane signalling with terminal devices, other network nodes of a radio access network of the cellular communication system, and with network nodes of the core network 130. The control circuitry 32 may, for example, carry out transmission and reception of control messages in the cell 100. The control circuitry may also carry out signalling related to steps 404, 410, 600, 804 in the network node 110, for example.

The apparatus may further comprise a data communication circuitry 36 configured to carry out transmission and reception of payload data with terminal devices in the cell 100.

The apparatus may further comprise a beam configuration controller 38 configured to carry out configuration of radio beams with different beamforming configurations. The beamforming configuration may define the spatial filtering of each radio beam and, thus, define the coverage area of each beam. The beam configuration controller may schedule transmission timings of each beam, e.g. uplink/downlink transmission timings. The beam configuration controller 38 may further determine beam-specific transmission periodicities for the discovery signals transmitted in the radio beams according to any one of the above-described embodiments.

The apparatus may further comprise a resource allocation controller 34 configured to receive the periodicities of the discovery signal transmissions in the radio beams from the beam configuration controller and to allocate resources of the network node accordingly, e.g. the time-frequency resource and/or the hardware resources of the apparatus.

The modules 12 to 18 of the communication control circuitry 10 and the modules 32 to 38 of the communication control circuitry 30 may be considered as sub-circuitries of the respective communication control circuitry. They may be considered as operational modules realized by the same physical circuitry, or each module may be realized by a distinct physical circuitry. In some embodiments, each module may be considered as a computer program module defined by a dedicated computer program code.

FIG. 11 illustrates an embodiment of a transceiver architecture of the network node 110 or the apparatus of FIG. 10. As described above, the network node may employ the beamforming in the transmission of radio beams, and the beamforming may be realized by using an antenna array 88 comprising a plurality of antenna elements. In some embodiments, the number of antenna elements may be more than four, more than eight, more than 12, more than 20, more than 100, or even more than 1000. With a higher number of antenna elements, higher directivity of radio beams may be achieved. Additionally, spectral efficiency may be considered to have a relationship with the number of spatial streams the network node can support. The higher number of spatial streams results in higher spectral efficiency. Referring to FIG. 11, baseband modules 70, 72, 74 may perform baseband signal processing including modulation, channel coding, etc. for each radio beam. The number of baseband modules 72 to 76 may correspond to the number of transmitted radio beams, e.g. M. Each baseband module may be connected to a respective antenna port 80. Block 82 performs antenna port virtualization which may be described as mapping between the antenna ports 80 and transceiver units 84. In one implementation, each antenna port is mapped to one transceiver unit 84, e.g. one-to-one mapping. In another implementation, one antenna port may be connected to a plurality of transceiver units. The number of transceiver units may be K, and in an embodiment K=M while in another embodiment K M.

A transceiver unit 84 may comprise a digital-to-analog (D/A) converter in a transmitter chain and an analog-to-digital converter in a receiver chain. Accordingly, the transceiver unit may be the cut-off point for the above-described virtualization of signal processing operations. For example, the baseband modules, the antenna ports, and the antenna port virtualization may be carried out by the RCU, or some of them may be realized in the RRH. The transceiver unit may further comprise analog components conventionally used in a radio transceiver. Such components may include in the transmitter chain a frequency-converter, a power amplifier, a radio frequency filter. Such components may include in the receiver chain a low-noise amplifier, a radio frequency filter, and a frequency converter.

The transceiver units of the transceiver array 84 are connected to a radio distribution network 86 configured to perform the antenna virtualization in a radio frequency domain. The radio distribution network may then connect to L antenna elements 88. The radio distribution network 86 together with the antenna port virtualization 82 and/or the baseband modules may define a beamforming architecture of the transceiver structure and the network node. The beamforming may be realized by using digital signal processing techniques, analog signal processing techniques, or a hybrid of analogue and digital signal processing. In the digital beamforming, each transceiver unit may be connected to one antenna element, and the beamforming may be realized through digital pre-coding in which assigns an appropriate weight to each transmission/reception stream (M streams in the embodiment of FIG. 11). In the analog beamforming, the radio distribution network maps a signal from a transceiver unit to a plurality of antenna elements and controls amplification and phase of the signals applied differently such that the constructive and destructive interference of the signal emitted from the different antenna elements is achieved in the desired manner. In the hybrid solution, both analog and digital beamforming technique is employed, e.g. a part of the beamforming may be realized in the digital domain and another part in the analog domain.

Let us now consider some embodiments where the resources are reallocated upon increasing the period of the discovery signal transmission. In an embodiment employing the analog beamforming, a radio transceiver unit may be deactivated for the duration when no transmission of the discovery signal (or any signal) is carried out in the radio beam associated with the radio transceiver unit. This enables scalable power-saving in the network node according to the spatial distribution of the terminal device in the cell. Transceiver unit(s) associated with radio beam(s) serving no terminal devices may be deactivated to save power such that only the discovery signal is transmitted with the maximum transmission period. In an embodiment employing the digital or hybrid beamforming, the digital beamforming parameters may be adjusted according to the spatial distribution of the terminal devices. For example, a resource released from the discovery signal transmission may be employed in terminal-device-specific communications with enhanced beamforming capabilities, thus resulting in a higher quality of the radio beam serving the terminal device. This may be achieved by having a higher number of transceiver units for serving the terminal device when the discovery signal is not being transmitted.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 8 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2 to 8 or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2 to 8 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method comprising:
generating a plurality of radio beams in a cell, wherein said plurality of radio beams comprise a plurality of beamforming configurations, and wherein at least one radio beam comprised in the plurality of radio beams comprises a discovery signal transmission;
determining, for the at least one radio beam, whether or not at least one terminal device is located in a coverage area of the at least one radio beam and a number of terminal devices located in the coverage area of the at least one radio beam; and
defining a transmission periodicity of the discovery signal transmission on the basis of determining that at least one terminal device is located in the coverage area of the at least one radio beam and the number of terminal devices located in a coverage area of the at least one radio beam.

2. The method of claim 1, wherein the defining said transmission periodicity is carried out independently for each of the plurality of radio beams that comprise the discovery signal transmission.

3. The method of claim 1, wherein said determining is based on reception of an uplink message from at least one terminal device.

4. The method of claim 1, further comprising:
upon determining that no terminal devices are located in the coverage area of the at least one radio beam, selecting a maximum transmission period for the discovery signal transmission.

5. The method of claim 1, further comprising:
upon determining that no terminal devices are located in the coverage area of the at least one radio beam:
omitting transmissions of at least one of following signals in the at least one radio beam: a control message and a reference signal.

6. The method of claim 1, further comprising:
upon determining that no terminal devices are located in the coverage area of the at least one radio beam: allocating at least some of the resources of the at least one radio beam for use in at least one other radio beam.

7. The method of claim 6, wherein said resources comprise at least one of following resources: a radio transceiver hardware resource and a time-frequency resource.

8. The method of claim 1, further comprising:
causing transmission of at least one message indicating said transmission periodicity for each of the plurality of radio beams that comprise the discovery signal transmission.

9. The method of claim 1, further comprising:
causing an opportunistic discovery signal transmission in the at least one radio beam, wherein the opportunistic discovery signal transmission is offset in a time domain from transmission instances complying with the transmission periodicity.

10. A non-transitory computer-readable medium having stored thereon computer executable program code, readable by a computer, wherein the computer executable program code configures the computer to carry out the method of claim 1 when read by the computer.

11. An apparatus comprising:
at least one processor, and
at least one memory comprising a computer program code, wherein the processor, the memory, and the computer program code are configured to cause the apparatus to:
generate a plurality of radio beams in a cell, wherein said plurality of radio beams comprise a plurality of beamforming configurations, and wherein at least one radio beam comprised in the plurality of radio beams comprises a discovery signal transmission;
determine, for the at least one radio beam, whether or not at least one terminal device is located in a coverage area of the at least one radio beam and a number of terminal devices located in the coverage area of the at least one radio beam; and
define a transmission periodicity of the discovery signal transmission on the basis of determining that at least one terminal device is located in the coverage area of the at least one radio beam and the number of terminal devices located in a coverage area of the at least one radio beam.

12. The apparatus of claim 11, wherein the processor, the memory and the computer program code are further configured to cause the apparatus to define said transmission periodicity independently for each of the plurality of radio beams that comprise the discovery signal transmission.

13. The apparatus of claim 11, wherein the processor, the memory and the computer program code are further configured to cause the apparatus to carry out said determining as based on reception of an uplink message from at least one terminal device.

14. The apparatus of claim 11, wherein the processor, the memory and the computer program code are configured to cause the apparatus to, upon determining that no terminal devices are located in the coverage area of the at least one radio beam, select a maximum transmission period for the discovery signal transmission.

15. The apparatus of claim 11, wherein the processor, the memory and the computer program code are configured to cause the apparatus to, upon determining that no terminal devices are located in the coverage area of the at least one radio beam, omit transmissions of at least one of following signals in the at least one radio beam: a control message and a reference signal.

16. The apparatus of claim 11, wherein the processor, the memory and the computer program code are configured to cause the apparatus to, upon determining that no terminal devices are located in the coverage area of the at least one radio beam, allocate at least some of the resources of the at least one radio beam for use in at least one other radio beam.

17. The apparatus of claim 16, wherein said resources comprise at least one of following resources: a radio transceiver hardware resource and a time-frequency resource.

18. The apparatus of claim 11, wherein the processor, the memory and the computer program code are configured to cause the apparatus to cause transmission of at least one message indicating said transmission periodicity for each of the plurality of radio beams that comprise the discovery signal transmission.

* * * * *